United States Patent
Handshaw et al.

(10) Patent No.: US 9,740,903 B2
(45) Date of Patent: Aug. 22, 2017

(54) MODULE OR ARRANGEMENT FOR, AND METHOD OF, UNIFORMLY AND EFFICIENTLY ILLUMINATING A TARGET BY GENERATING AN ILLUMINATION PATTERN THAT IS SUBSTANTIALLY CONGRUENT TO AND OVERLAPS A FIELD OF VIEW OF AN IMAGING READER

(71) Applicant: SYMBOL TECHNOLOGIES, LLC, Lincolnshire, IL (US)

(72) Inventors: Darran M. Handshaw, Sound Beach, NY (US); Edward D. Barkan, Miller Place, NY (US); Mark E. Drzymala, St. James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/861,556

(22) Filed: Sep. 22, 2015

(65) Prior Publication Data
US 2017/0083729 A1    Mar. 23, 2017

(51) Int. Cl.
*G06K 7/10* (2006.01)

(52) U.S. Cl.
CPC ..... *G06K 7/10742* (2013.01); *G06K 7/10732* (2013.01); *G06K 7/10831* (2013.01); *G06K 7/10861* (2013.01)

(58) Field of Classification Search
CPC .......... G06K 7/10693; G06K 7/10871; G06K 7/10722; G06K 7/10653; G06K 7/10584
USPC ............................ 235/462.4, 462.41, 462.33
See application file for complete search history.

(56) References Cited

U.S. PATENT DOCUMENTS

| | | | | |
|---|---|---|---|---|
| 3,973,107 A | * | 8/1976 | Walter ............... | G06K 7/10861 235/458 |
| 5,389,771 A | * | 2/1995 | Amendolia ...... | G06K 19/06009 235/375 |
| 5,475,207 A | * | 12/1995 | Bobba ............... | G06K 7/10574 235/383 |

* cited by examiner

*Primary Examiner* — Karl D Frech
(74) *Attorney, Agent, or Firm* — Yuri Astvatsaturov

(57) ABSTRACT

An illumination light source emits illumination light toward a target to be read by image capture. An imaging assembly captures the illumination light returning from the target along an imaging axis over a field of view that extends along mutually orthogonal, first and second directions that are generally perpendicular to the imaging axis. A compound parabolic reflector receives, and optically modifies, the emitted illumination light to generate a generally uniform illumination light pattern that is substantially congruent to, and substantially overlaps, the field of view along both of the first and second directions. The compound parabolic reflector has first and second pairs of parabolic segments for respectively reflecting the emitted illumination light over first and second illumination angles along the first and second directions.

20 Claims, 6 Drawing Sheets

MODULE OR ARRANGEMENT FOR, AND METHOD OF, UNIFORMLY AND EFFICIENTLY ILLUMINATING A TARGET BY GENERATING AN ILLUMINATION PATTERN THAT IS SUBSTANTIALLY CONGRUENT TO AND OVERLAPS A FIELD OF VIEW OF AN IMAGING READER

BACKGROUND OF THE INVENTION

The present disclosure relates generally to a module or arrangement for, and a method of, illuminating a target to be electro-optically read by image capture and, more particularly, to uniformly and efficiently illuminate the target by generating an illumination light pattern that is substantially congruent to, and substantially overlaps, a field of view of an imaging reader.

Solid-state imaging systems or imaging readers have long been used, in both handheld and hands-free modes of operation, in many industries, such as retail, manufacturing, warehousing, distribution, postal, transportation, logistics, etc., to electro-optically read targets, such as one- or two-dimensional bar code symbols to be decoded. A known imaging reader generally includes an imaging module that is mounted in a housing, and that has an illumination light source for emitting illumination light over an illumination angle centered on an illumination axis toward a target for reflection and scattering therefrom, a solid-state imager with a sensor array of photocells or light sensors, and an optical assembly for capturing return illumination light scattered and/or reflected from the target being imaged over a field of view centered on an imaging axis, and for projecting the captured illumination light onto the imager to initiate capture of an image of the target. The imager produces electrical signals that are decoded and/or processed by a programmed microprocessor or controller into information related to the target being read, e.g., decoded data identifying the target. The controller is operative for transmitting the decoded data, either via a wireless or wired link, to a remote host for further processing, e.g., price retrieval from a price database to obtain a price for the identified target.

Although generally satisfactory for its intended purpose, the illumination light does not always uniformly and/or efficiently illuminate the targets over a broad range of working distances relative to the reader. Typical targets, such as bar code symbols, have lengths that are greater in dimension than their heights, and are therefore generally rectangular in shape. To best read such targets, the field of view of the imager is likewise generally rectangular in shape. For optimum reading performance, it would be desirable for the illumination light to not only be similarly configured with a generally rectangular illumination light pattern that has substantially the same size and same shape as, and that substantially overlaps, the generally rectangular field of view, but also be of uniform intensity over the field of view and to be efficiently transmitted with a maximum amount of illumination light to each target. In the prior art, however, this is not always achieved, primarily because the illumination light source and the imager are physically spaced apart and are horizontally and/or vertically offset from each other. In addition, their respective illumination and imaging axes are not collinear, but are typically inclined relative to, and intersect, each other. The typical illumination light pattern is non-uniform in intensity since the light intensity is brightest along the illumination axis on which the illumination light source is centered, and then falls off away from the illumination axis, especially at outer end regions of the illumination light pattern. Also, the typical illumination light pattern is mismatched, i.e., not substantially congruent, to the field of view, and the amount of illumination light delivered to each target is low, thereby resulting in a poor light transmission efficiency.

Accordingly, it would be desirable to more uniformly and more efficiently illuminate a target to be read by image capture by generating an illumination pattern that is substantially congruent to, and substantially overlaps, a field of view of an imaging reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
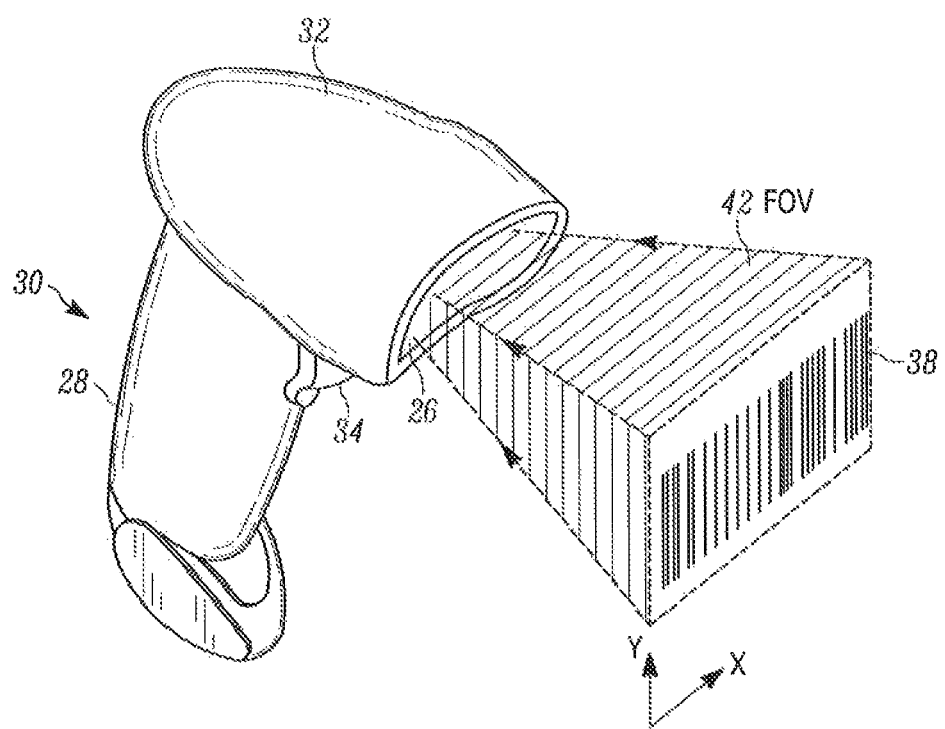
FIG. 1 is a perspective view of an exemplary embodiment of an electro-optical reader for reading target symbols by image capture in which an imaging module is mounted in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The module, arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an imaging module illuminates a target to be read by image capture, where the target is preferably a bar code symbol that is generally rectangular in shape. The imaging module includes an illumination light source, e.g., one or more light emitting diodes (LEDs), for emitting illumination light toward the target for reflection and scattering therefrom, and an imaging assembly having a two-dimensional array of image sensors for capturing the illumination light returning from the target along an imaging axis over a field of view, preferably likewise of generally rectangular shape, that extends along first and second extents, preferably of different extents, along mutually orthogonal, first and second directions that are generally perpendicular to the imaging axis. Typically, each one or more of the LEDs is offset, and spaced away from, the array along the first direction and/or the second direction. The imaging module also includes a compound parabolic reflector for receiving, and for optically modifying, the illumination light emitted from the illumination light source to generate a generally uniform illumination light pattern, again preferably of generally rectangular shape, that is substantially congruent to, and substantially overlaps, the field of view along both of the first and second directions. The compound parabolic reflector has a first pair of parabolic segments for reflecting the emitted illumination light over a first illumination angle along the first direction, and a second pair of parabolic segments for reflecting the emitted illumination light over a second illumination angle along the second direction.

In one embodiment, the compound parabolic reflector is a solid element whose parabolic segments have interior surfaces that reflect the illumination light away from the illumination light source with total internal reflection. In another embodiment, the compound parabolic reflector is a hollow element whose parabolic segments have interior surfaces that are reflective or have reflective coatings for reflecting the illumination light away from the illumination light source. In either embodiment, each pair of the parabolic segments may or may not be mirror symmetrical relative to an illumination axis of the compound parabolic reflector. In either embodiment, the curvature of each parabolic segment is independently adjusted, tuned, positioned, and configured to independently generate the desired first and second illumination angles to substantially match the illumination light pattern to the field of view, thereby overcoming the mismatch in the prior art caused by the aforementioned offset between the LEDs and the array along the first direction and/or the second direction.

In accordance with another feature of this disclosure, an arrangement for electro-optically reading a target by image capture comprises a housing, and the above-described imaging module supported by the housing. The housing may be handheld and/or hands-free.

In accordance with still another feature of this disclosure, a method of illuminating a target to be read by image capture is performed by emitting illumination light toward the target for reflection and scattering therefrom, by capturing illumination light returning from the target along an imaging axis over a field of view that extends along first and second extents along mutually orthogonal, first and second directions that are generally perpendicular to the imaging axis, by receiving, and optically modifying, the emitted illumination light to generate a generally uniform illumination light pattern that is substantially congruent to, and substantially overlaps, the field of view along both of the first and second directions, and by configuring a compound parabolic reflector with a first pair of parabolic segments for reflecting the emitted illumination light over a first illumination angle along the first direction, and with a second pair of parabolic segments for reflecting the emitted illumination light over a second illumination angle along the second direction.

Turning now to the drawings, reference numeral 30 in FIG. 1 generally identifies an ergonomic, electro-optical imaging reader configured as a gun-shaped housing having an upper barrel or body 32 and a lower handle 28 tilted away from the body 32. A light-transmissive window 26 is located adjacent the front or nose of the body 32. The reader 30 is held in an operator's hand and used in a handheld mode in which a trigger 34 is manually depressed to initiate reading of targets, especially bar code symbols 38, in a range of working distances relative to the window 26. As shown in FIG. 1, the illustrated symbol 38 is of the Universal Product Code (UPC) type of symbology, and has a plurality of bars of different widths spaced apart to bound spaces of different widths, the bars and spaces being arranged in a row lengthwise along the symbol in a horizontal direction, e.g., along the X-axis. The bars and spaces are of different light reflectivity and extend heightwise along the symbol 38 in a vertical direction, e.g., along the Y-axis. Although the illustrated symbol 38 has a generally rectangular shape, it will be understood that different configurations, e.g., a square shape, for the symbol may be employed and read by the reader. In addition, although the housing has been shown as gun-shaped, this is merely exemplary, because housings of many other configurations and types can also be employed. For example, the housing need not be handheld, but can be supported by a base or cradle for supporting the reader on a countertop or like support surface, in which case, the reader can be used in a hands-free mode as a stationary workstation in which symbols 38 are slid or swiped past, or presented to, the window 26. As other examples, the housing can be configured as a vertical slot scanner having a generally vertically arranged, upright window, or as a flat-bed or horizontal slot scanner having a generally horizontally arranged window, or as a bi-optical, dual window scanner having both generally horizontally and vertically arranged windows.

Figure 2:
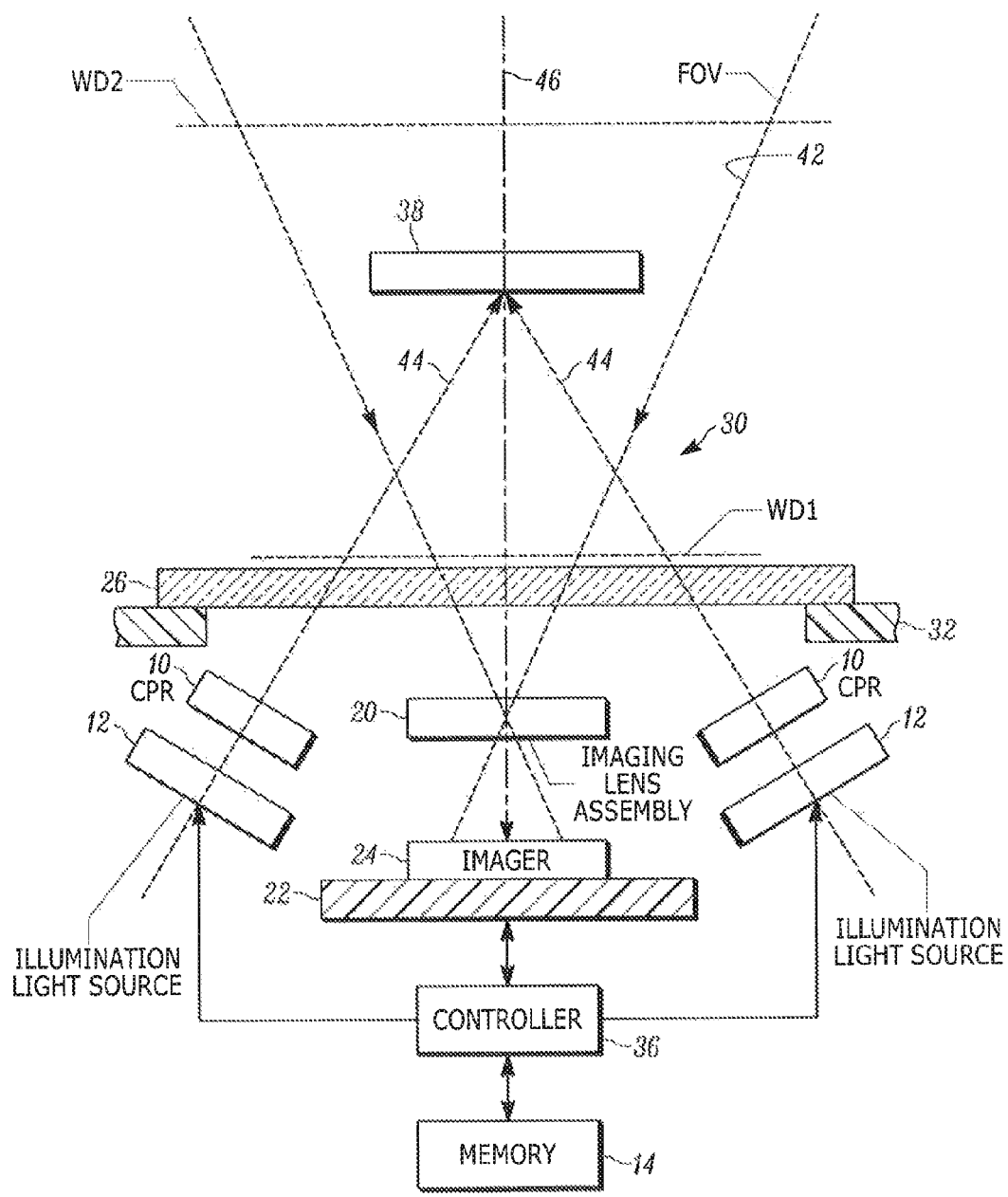
FIG. 2 is a schematic view of various electrical and optical components in the reader of FIG. 1.

As schematically shown in FIG. 2, an illuminating light source, e.g., one or more light emitting diodes (LEDs) 12, is mounted in the imaging reader 30. Each LED 12 is operative for illuminating the symbol 38 by emitting illumination light over an illumination angle centered on an illumination axis 44 toward the symbol 38 for reflection and scattering therefrom. Each LED 12 is provided with a compound parabolic reflector (CPR) 10 to uniformly and efficiently illuminate the target 38 with an illuminating light pattern. Details of each CPR 10, as best seen in the embodiments of FIGS. 3-10, are described below.

An imager 24 is mounted on a printed circuit board 22 in the reader 30. The imager 24 is a solid-state device, for example, a charge coupled device (CCD) or a complementary metal oxide semiconductor (CMOS) device. The imager 24 has a two-dimensional array of addressable image sensors or pixels arranged in mutually orthogonal rows and columns, and is operative for detecting illumination light that is returning from the symbol 38 through the window 26, and that is captured by an imaging lens assembly 20 over an imaging field of view (FOV) 42 centered on an optical path or imaging axis 46. The imaging lens assembly 20 is operative for adjustably focusing the return illumination light onto the array of image sensors to enable the symbol 38 to be read. The symbol 38 may be located anywhere in a working range of distances between a close-in working distance (WD1) and a far-out working distance (WD2). In a preferred embodiment, WD1 is about one inch from the window 26, and WD2 is about six or more inches away from the window 26.

As also shown in FIG. 2, the imager 24 and the illumination LEDs 12 are operatively connected to a controller or microprocessor 36 operative for controlling the operation of these components. A memory 14 is connected and accessible to the controller 36. Preferably, the microprocessor is the same as the one used for processing the return illumination light from the target symbols 38 and for decoding the captured target images. In operation, the microprocessor 36 sends a command signal to pulse the illumination LEDs 12 for a short exposure time period, say 500 microseconds or less, and energizes and exposes the imager 24 to collect light, e.g., the illumination light and/or ambient light, from the target symbol 38 only during said exposure time period. A typical array needs about 18-33 milliseconds to acquire the entire target image and operates at a frame rate of about 30-60 frames per second.

Figure 3:
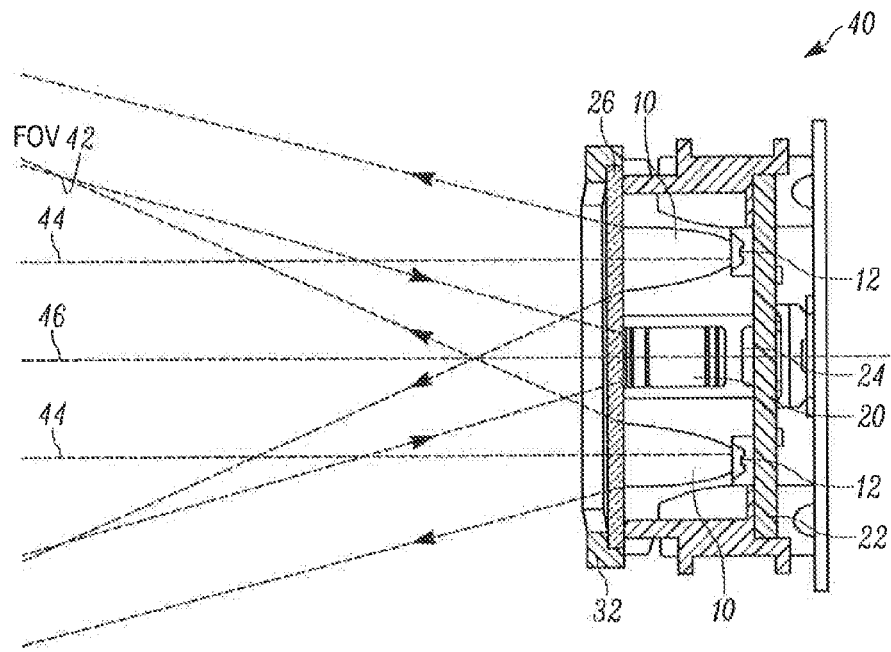
FIG. 3 is a sectional view, as seen from above, of an imaging module in isolation for mounting in the reader of FIG. 1.
Figure 4:
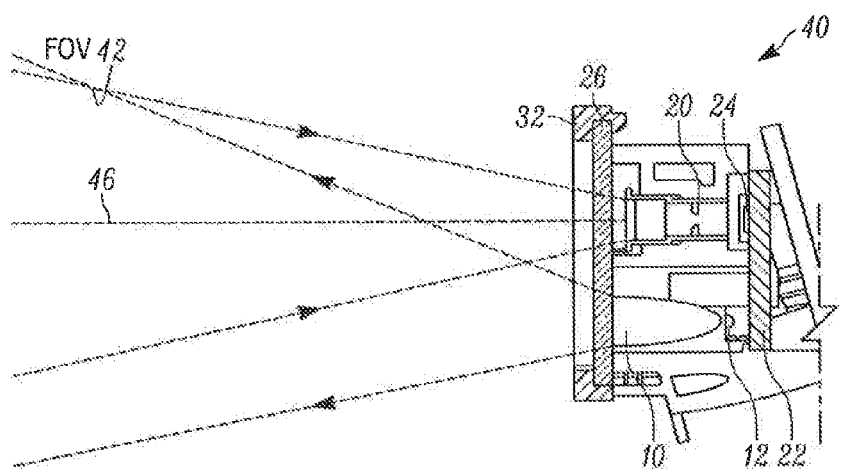
FIG. 4 is a sectional view, as seen from the side, of the imaging module of FIG. 3.

An embodiment of an imaging module 40 to be mounted in the reader 30 is shown in FIGS. 3-4. The imager 24 is preferably centrally mounted in the imaging module 40, and the LEDs 12 and their CPRs 10 are offset, and spaced away from, the imager 24 horizontally along the X-axis and/or vertically along the Y-axis. As shown, the LEDs 12 are located at opposite lateral sides of the imager 24, as well as below the imager 24, on the same printed circuit board 22 that extends from the body 32 downwardly along the tilted handle 28. Many other arrangements of the LEDs 12 and the imager 24 can be implemented. For example, the LEDs 12 may be mounted at an elevation above the imager 24. In addition, a single LED 12 may be used, e.g., one of the LEDs 12 illustrated in FIGS. 3-4 may advantageously be eliminated.

As previously described, the symbol 38 has a length that is greater in dimension than its height, and is therefore generally rectangular in shape, as best seen in FIG. 1. To best read such symbols 38, the imager 24 is preferably two-dimensional so that its field of view 42 is likewise generally rectangular in shape, as also best seen in FIG. 1. For optimum reading performance, it would be desirable for the illumination light from the LEDs 12 to be similarly configured with a generally rectangular illumination light pattern that has substantially the same size and same shape as, and that substantially overlaps, the generally rectangular field of view 42. However, the above-described offset relationship between the LEDs 12 and the imager 24 both horizontally and/or vertically is a primary factor in causing a mismatch or parallax error between the imaging field of view 42 of the imager 24 and the illumination light pattern of the LEDs 12.

Figure 5:
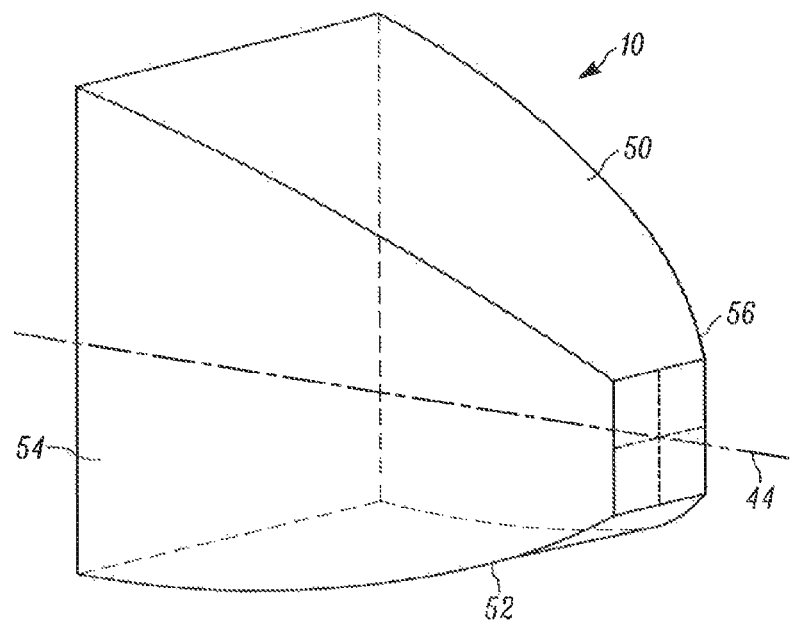
FIG. 5 is a perspective view of a compound parabolic reflector in accordance with this disclosure.
Figure 6:
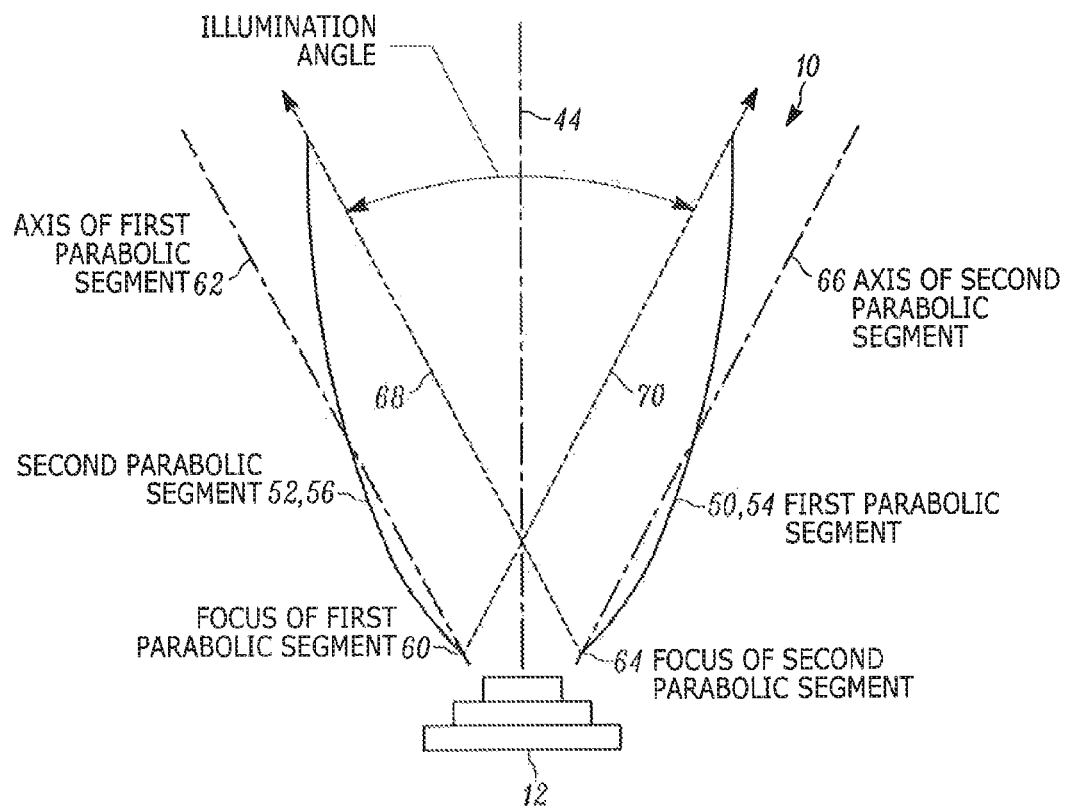
FIG. 6 is a diagrammatic view depicting details of the compound parabolic reflector of FIG. 5.

In accordance with this disclosure, each CPR 10 is configured to receive, and to optically modify, the illumination light emitted from each LED 12 to generate a generally uniform and efficient illumination light pattern, preferably of generally rectangular shape, that is substantially congruent to, and substantially overlaps, the field of view 42, again preferably of generally rectangular shape, along both mutually orthogonal first and second directions, i.e., along the X- and Y-axes. As shown in FIG. 5, each CPR 10 has a first pair of parabolic segments 50, 52 that are located at opposite sides of the illumination axis 44 for reflecting the emitted illumination light over a first illumination angle along the first direction (X-axis), and a second pair of parabolic segments 54, 56 that are also located at opposite sides of the illumination axis 44 for reflecting the emitted illumination light over a second illumination angle along the second direction (Y-axis). As shown in FIG. 6, a first parabolic segment, e.g., either 50 or 54, has a first focus 60 and a first axis 62, and a second parabolic segment, e.g., either 52 or 56, has a second focus 64 and a second axis 66. The first and second parabolic segments have curvatures such that each LED 12 emits the illumination light over an illumination angle bounded by outer light rays 68, 70 that are generally parallel to the axes 62, 66.

Figure 7:
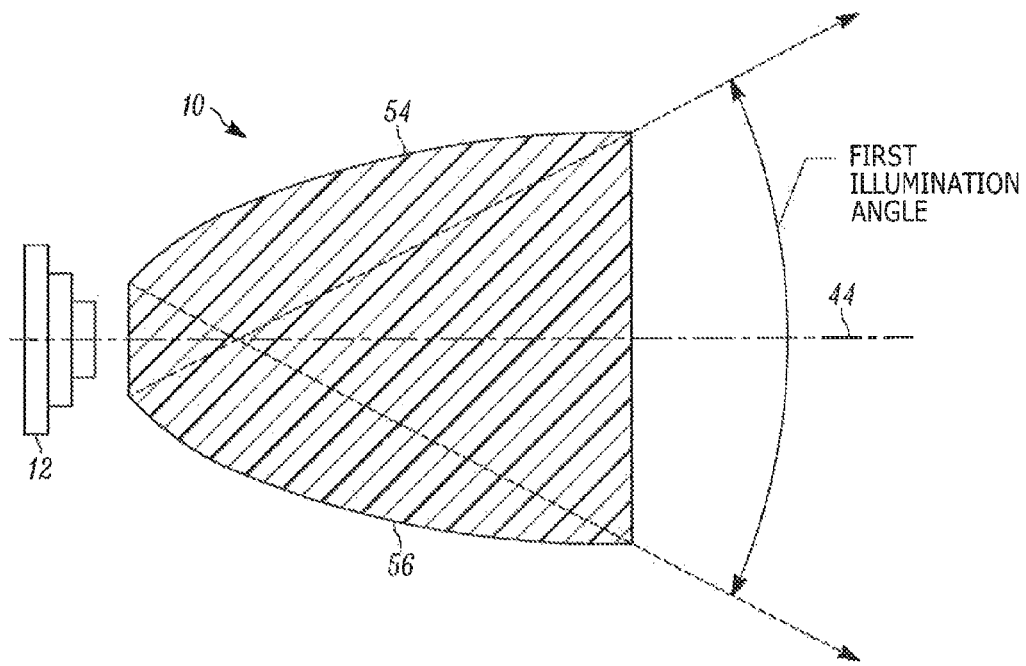
FIG. 7 is a part-sectional view, as seen from above, of one embodiment of the compound parabolic reflector.
Figure 8:
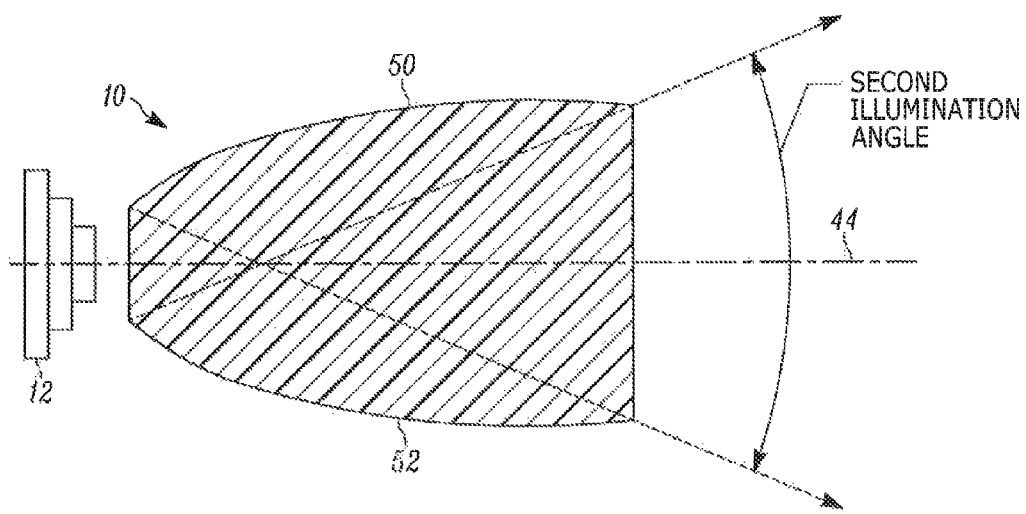
FIG. 8 is a part-sectional view, as seen from the side, of the embodiment of FIG. 7.
Figure 9:
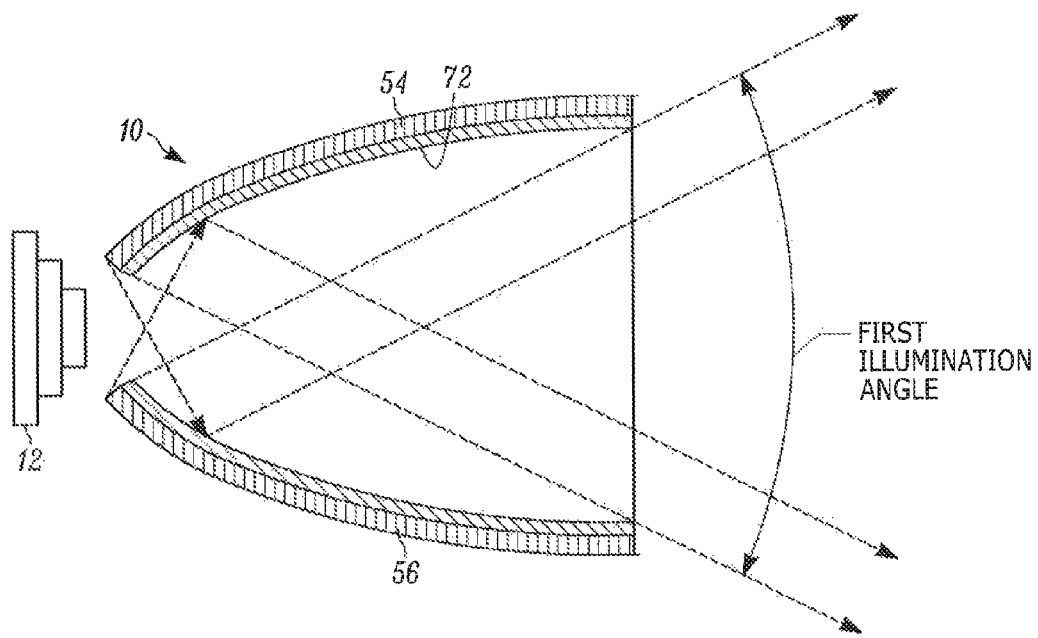
FIG. 9 is a part-sectional view, as seen from above, of another embodiment of the compound parabolic reflector.
Figure 10:
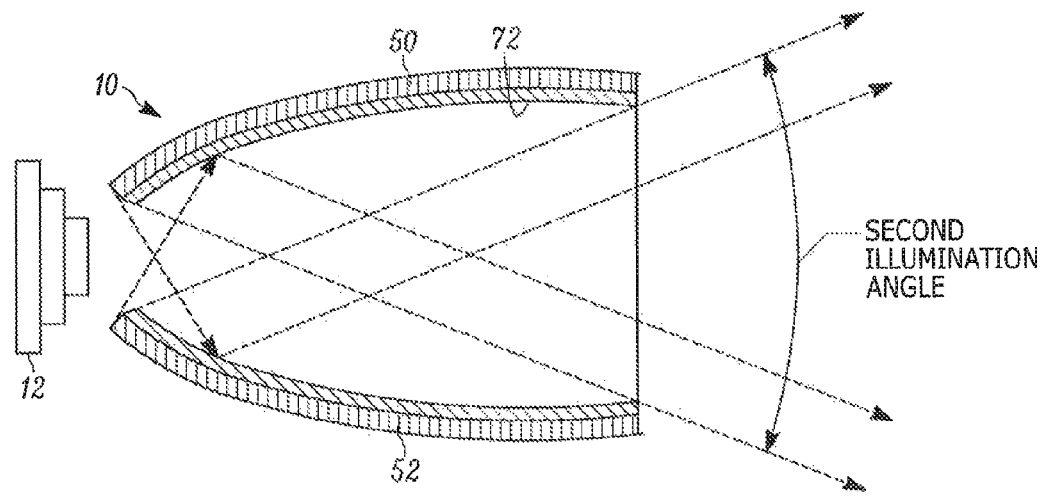
FIG. 10 is a part-sectional view, as seen from the side, of the embodiment of FIG. 9.

In one embodiment, as shown in FIGS. 7-8, each CPR 10 is a solid element, e.g., a molded plastic, whose interior surfaces reflect the illumination light away from each LED 12 with total internal reflection. The parabolic segments 54, 56 reflect the illumination light over a first illumination angle along the X-axis, and the parabolic segments 50, 52 reflect the illumination light over a second illumination angle along the Y-axis. The first illumination angle is advantageously greater than the second illumination angle to match the shape of the target 38. In another embodiment, as shown in FIGS. 9-10, each CPR 10 is a hollow element whose interior surfaces reflect the illumination light away from each LED 12. The parabolic segments 54, 56 reflect the illumination light over a first illumination angle along the X-axis, and the parabolic segments 50, 52 reflect the illumination light over a second illumination angle along the Y-axis. The first illumination angle is advantageously greater than the second illumination angle to match the shape of the target 38. Each CPR 10 can be made of a polished metal material, or of a plastic material whose interior surfaces have reflective coatings 72, for reflecting the illumination light away from each LED 12.

In either embodiment, the parabolic segments 54, 56 may or may not be mirror symmetrical relative to its illumination axis 44. In either embodiment, the pairs of the parabolic segments 50, 52 and 54, 56 are independent of each other and may be positioned at different distances away from the illumination axis 44. In either embodiment, the curvature of each parabolic segment is independently adjusted, tuned, positioned and configured to generate the desired first and second illumination angles to substantially match the illumination light pattern to the field of view, thereby overcoming the mismatch in the prior art caused by the aforementioned offset between the LEDs 12 and the imager 24 along the first direction and/or the second direction.

In accordance with this disclosure, each CPR 10 generates a two-dimensional illumination light pattern that is generally rectangular, i.e., wide and short. The intensity of the illumination light pattern is uniform with much less fall off away from the illumination axis 44 at outer end regions of the illumination light pattern. Also, the coupling efficiency between each LED 12 and each CPR 10 is improved, thereby increasing light transmission throughput and enhancing reading performance.

In the foregoing specification, specific embodiments have been described. However, one of ordinary skill in the art appreciates that various modifications and changes can be made without departing from the scope of the invention as set forth in the claims below. For example, each CPR 10 can be designed with as many parabolic segments as desired to match a more complicated field of view 42 that has more than four sides. The illumination light pattern can vary omni-directionally. In addition, in the case of the solid CPR 10 of FIGS. 7-8, it can be simultaneously molded directly as an integral part of the window 26. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for illuminating a target to be read by image capture, comprising:
   an illumination light source for emitting illumination light toward the target for reflection and scattering therefrom;
   an imaging assembly having a two-dimensional array of image sensors for capturing the illumination light returning from the target along an imaging axis over a field of view that extends along first and second extents along mutually orthogonal, first and second directions that are generally perpendicular to the imaging axis; and
   a compound parabolic reflector for receiving, and for optically modifying, the illumination light emitted from the illumination light source to generate a generally uniform illumination light pattern that is substantially congruent to, and substantially overlaps, the field of view along both of the first and second directions, the compound parabolic reflector having a first pair of parabolic segments for reflecting the emitted illumination light over a first illumination angle along the first direction, and a second pair of parabolic segments for reflecting the emitted illumination light over a second illumination angle along the second direction.

2. The module of claim 1, wherein the illumination light source is a light emitting diode (LED) that is offset, and spaced away from, the array along both of the first and second directions.

3. The module of claim 1, wherein the field of view and the illumination light pattern are each generally rectangular in shape, and wherein the first and second extents of the field of view are different, and wherein the first and second illumination angles are different.

4. The module of claim 1, wherein the illumination light source is a pair of light emitting diodes (LEDs) each of which is offset, and spaced away from, the array along both of the first and second directions.

5. The module of claim 1, wherein the compound parabolic reflector is a solid element whose parabolic segments have interior surfaces that reflect the illumination light away from the illumination light source with total internal reflection.

6. The module of claim 1, wherein the compound parabolic reflector is a hollow element whose parabolic segments have interior surfaces that are reflective for reflecting the illumination light away from the illumination light source.

7. The module of claim 1, wherein each pair of the parabolic segments is independently configurable and positionable relative to an illumination axis of the compound parabolic reflector.

8. An arrangement for electro-optically reading a target by image capture, comprising:
a housing; and
an imaging module supported by the housing, the module including
an illumination light source for emitting illumination light toward the target for reflection and scattering therefrom,
an imaging assembly having a two-dimensional array of image sensors for capturing illumination light returning from the target along an imaging axis over a field of view that extends along first and second extents along mutually orthogonal, first and second directions that are generally perpendicular to the imaging axis, and
a compound parabolic reflector for receiving, and for optically modifying, the illumination light emitted from the illumination light source to generate a generally uniform illumination light pattern that is substantially congruent to, and substantially overlaps, the field of view along both of the first and second directions, the compound parabolic reflector having a first pair of parabolic segments for reflecting the emitted illumination light over a first illumination angle along the first direction, and a second pair of parabolic segments for reflecting the emitted illumination light over a second illumination angle along the second direction.

9. The arrangement of claim 8, wherein the illumination light source is a light emitting diode (LED) that is offset, and spaced away from, the array along both of the first and second directions.

10. The arrangement of claim 8, wherein the field of view and the illumination light pattern are each generally rectangular in shape, and wherein the first and second extents of the field of view are different, and wherein the first and second illumination angles are different.

11. The arrangement of claim 8, wherein the illumination light source is a pair of light emitting diodes (LEDs) each of which is offset, and spaced away from, the array along both of the first and second directions.

12. The arrangement of claim 8, wherein the compound parabolic reflector is a solid element whose parabolic segments have interior surfaces that reflect the illumination light away from the illumination light source with total internal reflection.

13. The arrangement of claim 8, wherein the compound parabolic reflector is a hollow element whose parabolic segments have interior surfaces that are reflective for reflecting the illumination light away from the illumination light source.

14. The arrangement of claim 8, wherein each pair of the parabolic segments is independently configurable and positionable relative to an illumination axis of the compound parabolic reflector.

15. A method of illuminating a target to be read by image capture, the method comprising:
emitting illumination light toward the target for reflection and scattering therefrom;
capturing illumination light returning from the target along an imaging axis over a field of view that extends along first and second extents along mutually orthogonal, first and second directions that are generally perpendicular to the imaging axis; and
receiving, and optically modifying, the emitted illumination light to generate a generally uniform illumination light pattern that is substantially congruent to, and substantially overlaps, the field of view along both of the first and second directions, by configuring a compound parabolic reflector with a first pair of parabolic segments for reflecting the emitted illumination light over a first illumination angle along the first direction, and with a second pair of parabolic segments for reflecting the emitted illumination light over a second illumination angle along the second direction.

16. The method of claim 15, wherein the capturing is performed by a two-dimensional array of image sensors, and wherein the emitting is performed by a light emitting diode (LED); and further comprising offsetting, and spacing the LED away from, the array along both of the first and second directions.

17. The method of claim 15, and configuring the field of view and the illumination light pattern to each be generally rectangular in shape, and configuring the first and second extents of the field of view to be different, and configuring the first and second illumination angles to be different.

18. The method of claim 15, and configuring the compound parabolic reflector as a solid element whose parabolic segments have interior surfaces, and reflecting the illumination light off of the interior surfaces with total internal reflection.

19. The method of claim 15, and configuring the compound parabolic reflector as a hollow element whose parabolic segments have interior surfaces, and reflecting the illumination light off of the interior surfaces.

20. The method of claim 15, and independently configuring and positioning each pair of the parabolic segments relative to an illumination axis of the compound parabolic reflector.

* * * * *